(12) United States Patent
Monroe, Sr.

(10) Patent No.: US 9,803,878 B2
(45) Date of Patent: Oct. 31, 2017

(54) PORTABLE AIR CONDITIONER

(76) Inventor: Ronald J. Monroe, Sr., Milan, GA (US)

(*) Notice: Subject to any disclaimer, the term of this patent is extended or adjusted under 35 U.S.C. 154(b) by 2025 days.

(21) Appl. No.: 12/757,944

(22) Filed: Apr. 9, 2010

(65) Prior Publication Data
US 2010/0192601 A1 Aug. 5, 2010

Related U.S. Application Data

(63) Continuation of application No. 11/744,207, filed on May 3, 2007, now abandoned.

(51) Int. Cl.
*F25D 3/02* (2006.01)
*F24F 5/00* (2006.01)
*F24F 1/04* (2011.01)

(52) U.S. Cl.
CPC .............. *F24F 5/0017* (2013.01); *F24F 1/04* (2013.01); *Y02E 60/147* (2013.01)

(58) Field of Classification Search
CPC .................................. F24F 5/0017; F24F 1/04
USPC .................. 62/383, 420, 421, 424, 426–427, 62/460–461, 89
See application file for complete search history.

(56) References Cited

U.S. PATENT DOCUMENTS

| | | | |
|---|---|---|---|
| 222,122 A * | 12/1879 | Bate | 62/89 |
| 1,969,643 A | 12/1932 | Fuchs et al. | |
| 2,093,853 A * | 9/1937 | Snavely | 62/383 |
| 2,129,255 A * | 9/1938 | Andros | 62/424 |
| 2,682,987 A | 7/1954 | Spiess, Jr. | |
| 2,841,964 A | 7/1958 | Anderson | |
| 2,959,032 A | 11/1960 | Davis | |
| 3,164,971 A | 1/1965 | Gentz | |
| 4,468,932 A | 9/1984 | Bullard | |
| 5,201,194 A | 4/1993 | Flynn, Jr. et al. | |
| 5,636,524 A | 6/1997 | Woods et al. | |
| 5,737,938 A | 4/1998 | Liu | |
| 6,401,483 B1 | 6/2002 | Kopp | |
| 6,568,202 B1 | 5/2003 | Hodges | |
| 6,843,062 B2 * | 1/2005 | Crete | 62/60 |
| 2006/0225453 A1 | 10/2006 | Martello | |
| 2007/0000277 A1 | 1/2007 | Bratcher | |

* cited by examiner

*Primary Examiner* — Orlando E Aviles Bosques
(74) *Attorney, Agent, or Firm* — Michael Drew

(57) ABSTRACT

A portable air conditioner (10) that has a loading chamber (30) substantially separated from a heat-transfer chamber (32) within a housing (20). Heat-transfer cells (40) for holding a phase-changeable, frozen substance such as ice (3), have an open end that is accessible from the loading chamber (30) and have cell housings (42, 44) disposed within the heat-transfer chamber (32). An air-flow mechanism (62) causes air to be drawn in through at least one air-intake opening (60), circulated among the heat-transfer cells (40) and urged outwardly of the unit housing (20) through at least one air-outlet opening (70, 72).

18 Claims, 3 Drawing Sheets

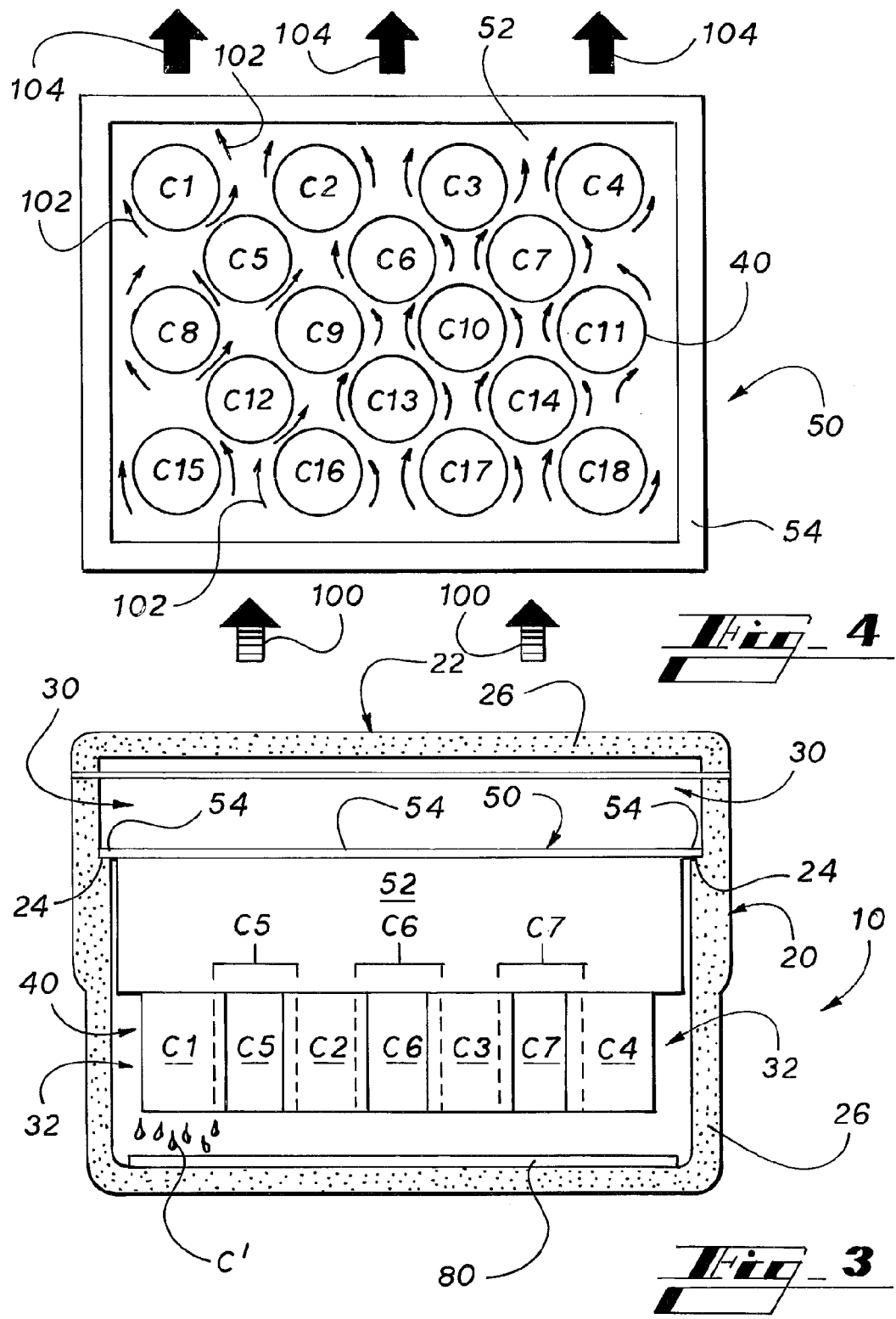

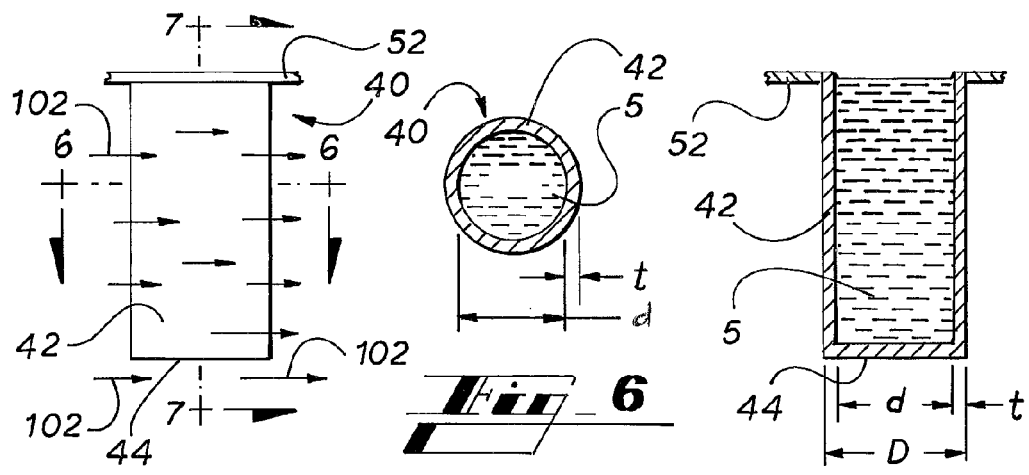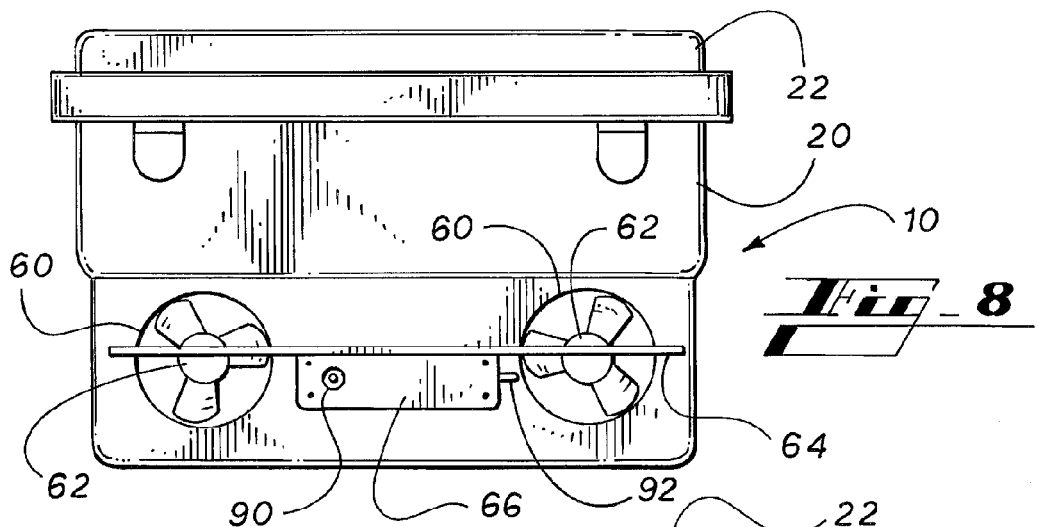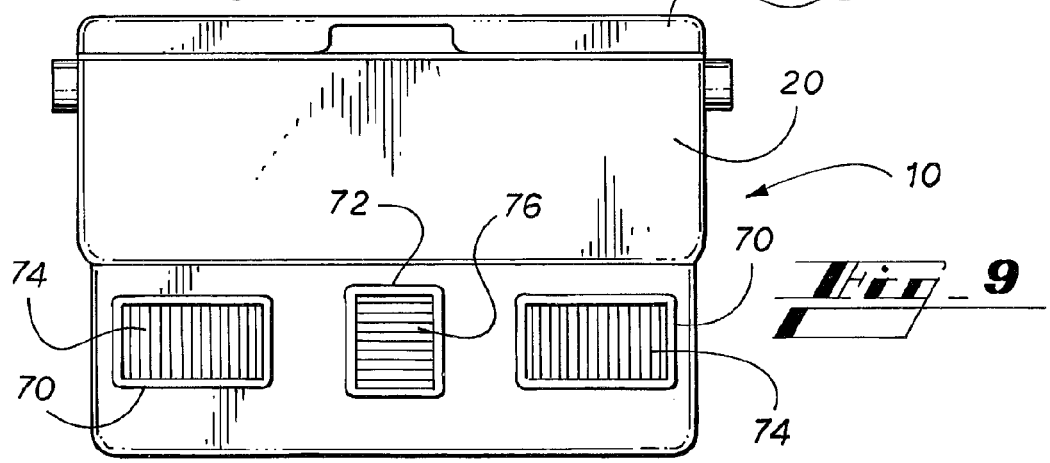

PORTABLE AIR CONDITIONER

RELATED APPLICATIONS

This application is a continuation of U.S. NonProvisional patent application Ser. No. 11/744,207 filed May 3, 2007 now abandoned, the entire contents of which are hereby incorporated by reference.

TECHNICAL FIELD OF THE INVENTION

The invention relates generally to air conditioners. More specifically, the invention relates to a portable air conditioner that utilizes heat-transfer properties of a phase-changeable, frozen substance, such as ice, to cool an environment.

BACKGROUND OF THE INVENTION

Air conditioners are devices that are useful for cooling environments or spaces. A typical air conditioner utilizes a compressor in conjunction with an evaporator coil to cycle a refrigerant through liquid and gaseous phases under controlled pressures to extract heat from air. A compressor typically requires a substantial amount of alternating current (AC) electrical power for a substantial period of time in order to operate. Often, however, individuals desire to cool environments or spaces remote from a source of standard AC electrical power. Thus, it can be appreciated that it would be useful to have an effective air conditioner that does not require substantial AC electrical power to operate. It can be further appreciated that it would be even more useful to have an air conditioner that does not require any AC electrical power and that would operate effectively in a location that is remote from standard AC electrical power.

The following are examples of known portable air-conditioning devices:

U.S. Pat. No. 2,959,032 to Davis discloses an apparatus for cooling air.

U.S. Pat. No. 5,201,194 to Flynn, Jr. et al. discloses a food serving and storage container.

U.S. Pat. No. 3,164,971 to Gentz discloses an auto cooler.

U.S. Pat. No. 6,568,202 to Hodges discloses a portable air conditioner that blows air through ice as a cooling medium in a closed container.

U.S. Pat. No. 6,401,483 to Kopp discloses a portable air conditioner that is essentially a fan-driven unit that fits over the top of an ice chest.

U.S. Pat. No. 5,737,938 to Liu discloses an air-conditioning system with portable air-conditioning unit.

U.S. Pat. No 5,636,524 to Woods, et al. discloses a porous platform for the bottom of an ice chest to keep items out of water that has collected at the bottom of the chest.

US 2007/0000277 filed by Bratcher discloses a box-like structure having three parallel compartments separated by apertured walls. Cooling material is placed in the lateral compartments and air is drawn through the central compartment.

US 2006/0225453 filed by Martello discloses a portable air conditioner that circulates cool water to what is designated in the application as an evaporator coil (but which does not appear to have the characteristics of or to function as a typical air-conditioning evaporator coil).

The above examples of portable air-conditioning devices appear to be lacking either in effectiveness or convenience of use to optimally address the problems set forth above.

Therefore, a heretofore unaddressed need exists in the industry to address the aforementioned deficiencies and inadequacies.

SUMMARY OF THE INVENTION

The present invention overcomes the disadvantages of the prior art by providing a portable air conditioner that has a loading chamber substantially separated from a heat-transfer chamber within a housing. Heat-transfer cells for holding a phase-changeable, frozen substance such as ice have an open end that is accessible from the loading chamber and have cell housings disposed within the heat-transfer chamber. An air-flow mechanism such as a fan causes air to be drawn in through at least one air-intake opening, circulated around the heat-transfer cells and urged outwardly of the air-conditioner unit housing through at least one air-outlet opening.

According to another aspect of the invention, a removable tray having heat-transfer cells depending therefrom substantially separates the loading chamber from the heat-transfer chamber.

According to a further aspect of the invention, each heat-transfer cell is cylindrical.

According to still a further aspect of the invention, the air-flow mechanism is disposed proximate to the air-intake opening.

According to an even further aspect of the invention, a fan is disposed within each of a plurality of air-intake openings.

According to an additional aspect of the invention, a fan that causes air to flow into and out of the heat-transfer chamber runs on modest voltage from a direct current (DC) power source and draws modest current.

Other systems, methods, features, and advantages of the present invention will be or become apparent to one with skill in the art upon examination of the following drawings and detailed description. All such additional systems, methods, features, and advantages are included within the scope of the present teaching and are protected by the accompanying claims.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 3 is a sectional view of the exemplary embodiment of the air-conditioner of FIG. 1, taken along line 3-3 near the front of the apparatus looking rearward, according to the present invention.

FIG. 4 is a plan view of an underside of the exemplary embodiment of the tray-and-cell subassembly of FIGS. 1, 2 and 3, from a viewpoint looking upward from the bottom of the air conditioner of FIG. 3, according to the present invention.

Figures 1, 2:
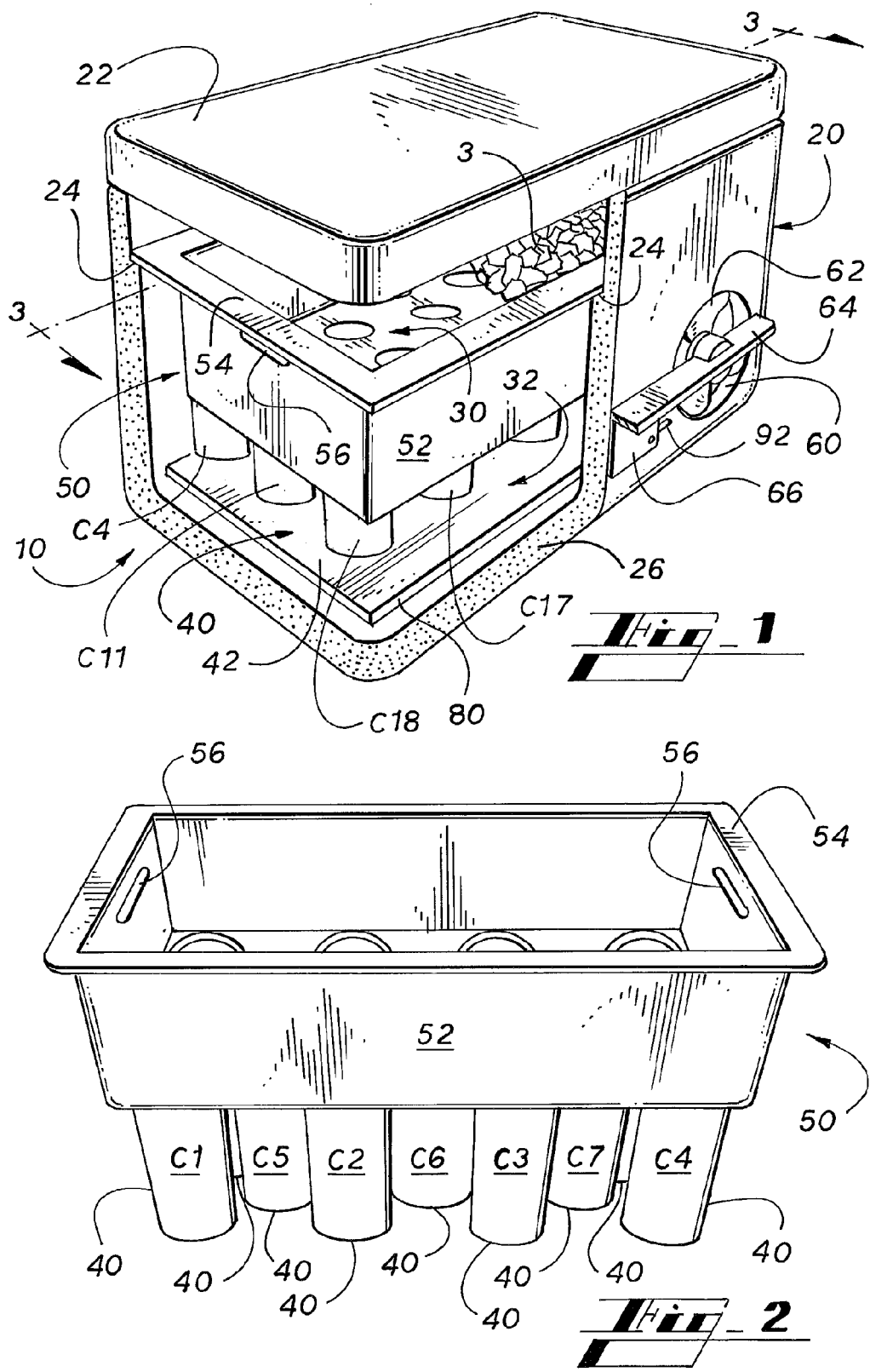
FIG. 1 is a perspective, partially cut-away view of an exemplary embodiment of a portable air conditioner, according to the present invention.
FIG. 2 is a perspective view of an exemplary embodiment of a heat-transfer tray-and-cell subassembly, according to the present invention.

FIG. 5 is an elevation view of an exemplary embodiment of a heat-transfer cell, according to the present invention.

FIG. 6 is a sectional view of the heat transfer cell of FIG. 5 taken along line 6-6 of FIG. 5, according to the present invention.

FIG. 7 is a sectional view of the heat transfer cell of FIG. 5 taken along line 7-7 of FIG. 5, according to the present invention.

FIG. 8 is a rear elevation view of the exemplary embodiment of the portable air conditioner of FIG. 1, according to the present invention.

FIG. 9 is a front elevation view of the exemplary embodiment of the portable air conditioner of FIG. 1, according to the present invention.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Referring now to the drawings, wherein like numerals indicate like elements throughout the several views, the drawings illustrate certain of the various aspects of exemplary embodiments.

As an overview, the invention uses heat transfer between a cooler substance and warmer air to cool the warmer air. Further, the invention takes advantage of the phase-change characteristics of substances to extract heat from warm air. More specifically, the invention utilizes principles of heat of fusion and heat of sublimation applicable to substances in a frozen, solid state to extract significant amounts of heat from warm air. "Heat of fusion" (also known as "latent heat of fusion" and "enthalpy of fusion") may be generally defined as the amount of heat energy required to convert a substance from its solid phase (or state) to its liquid phase (or state). An example of this type of conversion is the conversion of water ice to water. This type of transformation is typically called melting. "Heat of sublimation" may be generally defined as the amount of heat energy required to convert a substance directly from its solid phase (or state) into its gaseous phase (or state). An example of this type of conversion is the conversion of so-called dry ice (which is frozen carbon-dioxide) to its vaporous state (gaseous carbon dioxide). The terminology used herein to encompass both a substance undergoing a phase change from a frozen, solid state to a liquid state and a substance undergoing a phase change from a frozen, solid state directly to a gaseous state is "phase-changeable, frozen substance."

Referring first to FIG. 1, an exemplary embodiment of a portable air-conditioner 10 according to the present invention has a unit housing 20 with an openable cover 22. Within the housing 20, a loading chamber 30 is substantially separated from a heat-transfer chamber 32. Heat-transfer cells 40 are disposed within the heat-transfer chamber 32. A tray-and-cell subassembly 50 serves as a partition that substantially separates the loading chamber 30 from the heat-transfer chamber 32 and also positions the heat-transfer cells 40 in the heat-transfer chamber 32.

Heat-transfer cells 40 depending from the tray housing 52 of the subassembly 50 are disposed in the heat-transfer chamber 32. Each cell 40 has an upper, open end that opens into the loading chamber 30. Each heat-transfer cell 40 includes a cell body, or housing, 42 that terminates in a lower, closed end 44. The tray-and-cell subassembly 50 has a bucket-type tray housing 52 with a flange 54 extending around a perimeter of a top open end. Apertures 56 formed in the tray housing 52 serve multiple purposes. The apertures 56 serve as handles for lifting the tray subassembly 50 and also serve as vents (described in more detail herein below). The tray housing 52 is shown containing a quantity of crushed ice 3 (which may be water ice or dry-ice).

Air-intake openings 60 are disposed in what may be considered the rear wall of the unit housing 20. An air-flow mechanism 62, such as a fan, for drawing air into the unit housing 20 may be disposed as shown in proximity to the air-intake opening 60. The invention also contemplates that air-intake openings 60 may be disposed in one or more side walls of the unit housing 20 either in addition to being located in the rear wall or as an alternative to being located in the rear wall.

A segment of a support brace 64 and a segment of a box-member 66 (both described in greater detail below) are shown in the partial cut-away view of FIG. 1.

All of the features of the exemplary embodiments of the invention cannot be seen from FIG. 1 and will be described below.

Referring to FIG. 2, in the tray-and-cell subassembly 50 heat-transfer cells 40 arranged in an array depend from a tray housing 52. A flange 54 extends around the perimeter of the top opening of the tray housing 52. As can be seen partially in FIG. 1 and in FIG. 3 (that will be discussed later), the tray-and-cell subassembly 50 serves multiple purposes. The subassembly 50 helps partition and separate the loading chamber 30 from the heat-transfer chamber 32. In addition, the subassembly 50 helps position the heat-transfer cells 40 in the heat-transfer chamber 32.

Although as few as one heat-transfer cell 40 may be used, the invention is much more effective when several, or a plurality, of cells 40 are used. Multiple cells 40 are positioned with respect to one another to maximize the number of cells impacted by air flow. Each cell 40 is shaped in a geometric configuration that maximizes the surface area that is subjected to air flowing through the heat-transfer chamber 32.

To help aid in understanding the invention, each cell 40 in the exemplary embodiment illustrated is numbered consecutively as C1 through C18. This numbering system is most clearly shown in FIG. 4, which will be discussed later, and is also shown to a certain extent in FIG. 3.

Opposing handle/vent apertures 56 are formed in end walls of the tray housing 52. As handles, the handle/vent apertures 56 may be used to lift the tray-and-cell subassembly 50. Each aperture 56 also serves as a vent.

Reference is now made simultaneously to FIGS. 1, 2 and 3 to aid in a discussion of the venting function of the handle/vent apertures 56. The invention incorporates and promotes venting between the heat-transfer chamber 32 and the loading chamber 30. The venting feature is incorporated to promote phase change as evenly as possible throughout the phase-changeable substance. For example, when crushed water ice 3 is used, and the tray housing 52 is filled to a level at least slightly above the bottom of the tray housing 52 (which is the level of the opening into the tops of the cells 40), the ice that is in the bottom of the cells 40 is in closest contact with the warm air flowing through the heat-transfer chamber 32 will melt first, gradually changing into water. As the ice in the cells 40 melts, a gap may form between the water that collects in the bottom portion of the cells 40 from melted ice and the ice in the tray housing 52 and/or the ice near the top of the cells 40. This gap may prevent the ice above the gap from being subjected to the temperature differential created by the warm air. Because maximum cooling is achieved through the melting of the ice, the vents 56 are disposed to promote convective air flow from the heat-transfer chamber 32 up into the loading chamber 30 to promote melting of the uppermost regions of ice. Melting in the uppermost region will promote the falling of cool water and/or ice into the lower portions of the cells 40 located in the heat-transfer chamber 32. The water that collects in the bottom of the cells 40 more effectively removes heat from the surrounding air if that water is commingled with ice or cooler water that falls from the tray 52 area above. There is a natural convective flow of warm air upwardly; however, pressurization of the heat-transfer chamber 32 (which will be discussed further below) will enhance the flow of warm air into the loading chamber 30.

Although the exemplary embodiment illustrated shows a handle/vent aperture 56 formed in each end-wall of the tray housing 52 as a design option, apertures may be placed instead, or in addition, in the longitudinally extending side walls or in the flange 54. Further, although two apertures 56 are shown, as few as one and more than two may be used. The number of apertures used affects the venting process and thus can be used as a means for promoting greater or lesser venting.

Referring now particularly to FIG. 3, the alignment of several features of the teachings of the invention can be seen in this rearward-facing sectional view taken from near the front of the main housing unit 20 along section line 3-3. Thus, FIG. 3 views the air conditioner from the front with the front wall removed. The unit housing 20 and openable (fully or partially removable) cover 22 are shown as having a wall thickness that includes insulation 26. Either one or both of the unit housing 20 and cover 22 may be insulated. The unit housing 20 and cover 22 may be insulated with materials and in a manner typically used to insulate portable ice chests or coolers. For example, a plastic shell may encase an air space or foam material such as the STYROFOAM® brand foam material. As another example, the unit housing 20 or cover 22, or both, may be formed of insulating material that extends from an outer surface to an inner surface. Stated differently, a shell and encased material may be the same and extend substantially continuously throughout the walls of the unit housing 20 or cover 22.

Insulation 26 retards, or at the very least, does not promote, heat transfer. Insulation 26 helps assure that heat transfer with the phase-changeable, frozen material takes place in a controlled manner primarily in the heat-transfer chamber rather than incidentally through the walls of unit housing 20 or through the cover 22. However, the invention may be practiced so that some heat transfer is permitted through the walls of the unit housing 20 or through the cover 22, if desired. Insulation 26 also helps delay heat transfer while the apparatus is being transported to a desired environment or location.

The unit housing 20 has a ledge, or lip, 24 that supports the flange 54 of the tray-and-cell subassembly 50. The subassembly 50 separates the loading chamber 30 from the heat-transfer chamber 32. The tray housing 52 depends from the flange 54. In turn, the heat-transfer cells 40 depend from the tray housing 52 optimally disposed in a staggered array that creates a baffle in the heat-transfer chamber 32. Handle/vent apertures 56 help promote insertion and removal of the tray-and-cell subassembly 50 with respect to the unit housing 20.

Some of the cell numbering can be seen in FIG. 3. A first row C1, C2, C3, C4 of cells 40 is followed by a second row C5, C6, C7 of staggered cells 40. For clarity, the outer side walls (or cell housings) of the second row C5, C6, C7 of cells 40 are shown in phantom view behind the first row C1, C2, C3, C4 of cells 40.

A condensate absorber 80 is disposed at the bottom of the unit housing 20 to receive any condensate c' falling from the cells 40. The condensate absorber 80 may be any absorptive type of material. Suitable material is a removable sheet of sponge material that can be wrung dry or dried by other typical drying processes.

Referring to FIG. 4, in the bottom plan view of the tray-and-cell subassembly 50, the baffle-type arrangement of the heat-transfer cells 40 can be seen. The view of FIG. 4 is from the underside of the subassembly 50 with the front of the subassembly 50 at the top of the page, as if the subassembly 50 shown in FIG. 3 is flipped upward out of the plane of the paper to create the view of FIG. 4. The view of FIG. 4 also illustrates the manner in which air flows (or circulates) through the heat-transfer chamber 32 and is distributed throughout the baffle arrangement of cells 40. For convenience of understanding, air that has been drawn into the heat-transfer chamber 32 from the rear of the unit housing 20 is denoted by broad arrows with a solid arrowhead and a striped body which arrows are identified by the numeral "100." Air in the heat-transfer chamber that circulates through the cells 40 is denoted by multiple, short straight- and curved-line arrows identified by the numeral "102." Air that has been cooled and that will exit the unit housing 20 through the air-outlet apertures (not shown) in FIG. 4 but denoted by numerals 70, 72 in FIG. 9 at the front of the unit housing is denoted by broad, solid arrows identified by the numeral "104."

Each heat-transfer cell 40 in the baffle array has been assigned an alpha-numeric character ranging from "C1" through "C18" for convenience of explanation and clarity to identify its location in the array of the exemplary embodiment. It is once again emphasized that the number and arrangement of cells 40 illustrated and discussed herein is not intended to be limiting, but merely exemplary of the teachings of the invention. As can be seen, the baffle type arrangement causes entering air 100 to circulate throughout the array and flow in a manner causing contact with many cells 40. Heat transfer occurs between the circulating air 102 and the cells 40, causing heat to be extracted from the circulating air 102. Thus, exiting air 104 is at a lower temperature than the entering air 100.

Referring to FIGS. 5, 6 and 7 simultaneously, an exemplary embodiment of a heat-transfer cell 40 is illustrated for a more detailed description. In the views of FIGS. 6 and 7, the cell 40 is shown containing a phase-changeable, frozen substance such as water ice, dry-ice or frozen gel in a non-crushed, substantially homogeneous, solid phase. The invention teaches a cell 40 adapted for receiving and retaining a phase-changeable, frozen substance such as ice. Although a cell 40 may have many different geometric configurations, the exemplary embodiment of a cylindrical shape is particularly effective. The open cross-section is particularly useful for retaining the frozen phase-changeable substance and providing an outer surface area that is exposed to circulating air 102. Other hollow shapes that may be employed include, but are not limited to, cubes, rectangular solids, wedges, hemispheres, and cones. Another benefit of the cylindrical shape is that the total heat-transfer surface area is maximized in that the side cell housing wall 42 and a bottom housing wall 44 both provide heat-transfer surfaces. Another advantage of the cylindrical configuration is that the curved body surface helps optimize air flow around the cell structure itself.

A further benefit of the cylindrical cell shape is that the curved body structure facilitates formation of the baffle array. In the array, the cylindrical cells can be closely interspersed without inhibiting air flow amongst the cells 40 while promoting air contact with many different cells 40. A still further benefit of the cylindrical shape is that particles of phase-changeable, frozen material, such as crushed or pulverized ice, can be easily received and retained in maximum quantities.

The cylindrical cell 40 has an outer diameter "D," an inner diameter "d," and a wall thickness "t." The larger the outer wall diameter D, the greater the surface area that can be contacted. However, use of cylinders of smaller diameter facilitates use of more cylinders and a baffle arrangement that can optimize contact with the air flow 102. A thinner wall thickness t increases the rate of heat transfer but may lessen the durability of the cell 40. While a thicker wall thickness t enhances durability, increases cost and decreases the rate of heat transfer.

In general, a cell 40 can be formed of any material that can adequately retain the phase-changeable, frozen substance used for cooling. However, cells 40 can be made more useful to the extent that they are made of a material that promotes maximum heat transfer between the phase-changeable, frozen substance and the air to be cooled. A substance that is particularly suitable for forming the cells 40 is aluminum because it can be easily and fairly inexpensively manufactured into durable hollow cylinders of many different thicknesses having a closed end and an open end. In addition, aluminum is a material that is considered to be substantially thermally conductive. Thermal conductivity is generally considered to be the ability of a material to conduct heat. Other substances (metals in particular) from which the cells may be formed that have even higher thermal conductivity than aluminum include silver, copper and gold. However, these substances are inherently much more costly than aluminum. Tin, zinc and brass are materials not as costly as gold, copper or silver that may also be manufactured into cells 40 of the desired geometric configuration. However, tin, zinc and brass are not as thermally conductive as aluminum, and brass is not as cost-effective as aluminum.

Referring to FIG. 8, a rear elevation view of an exemplary embodiment of a portable air conditioner 10 shows air-intake openings 60 disposed in the rear of the unit housing 20 through which air is taken into the heat-transfer chamber 32. One or more air-flow mechanisms 62, such as fans, are disposed with respect to the unit housing 20 to cause air to flow into the heat-transfer chamber 32. Although several air-intake openings 60 and accompanying air-flow mechanisms 62 are shown, as few as a single intake opening 60 and as few as a single mechanism 62, with or without direct alignment with one another, may be used. As previously discussed herein, air-intake openings may be located in one or more side walls either instead of or in addition to the rear-wall openings. A flange-like brace 64 (that may also be seen partially in FIG. 1) is directly or indirectly attached to the unit housing 20 and has multiple purposes. The brace 64 may be indirectly attached to the unit housing 20 through the box-member 66 that may be adapted to further support the brace 64. The brace 64 serves as a support for the fans 62. The brace 64 also serves as a spacing element to prevent the rear wall of the unit housing 20 from being placed flush against a surface that would block the air-intake openings 60.

The box-member 66 may serve as a full or partial support for the brace 64; however, if the brace 64 is directly adjoined to the unit housing 20 the box-member 66 may function as an electrical unit only. The box-member 66 houses electrical and/or electronic components including a receptacle 90 for an adaptor or connector to an electric power source and a switch 92. The switch 92 may be a multi-position switch having "on" and "off" positions as well as settings for multiple speeds. The fans 62 and electrical/electronic elements of the box 66 are connected in typical, know manner.

Referring to FIG. 9, a front elevation view of an exemplary embodiment of a portable air conditioner 10 shows air-outlet openings 70, 72 disposed in the front of the unit housing 20 through which air is exhausted from the heat-transfer chamber 32. The openings 70, 72 may be fitted with registers 74, 76 to help direct air flow as desired. Although several air-outlet openings are shown, as few as a single opening 70, 72 may be used.

The air-flow mechanism 62 may be placed in several different locations suitable to facilitate the requisite air flow. For example, the air-flow mechanism 62 may be place externally or internally with respect to the unit housing 20, and may be placed proximate air-intake openings 60 or air-outlet openings 70 (not seen in FIG. 8). Placement of an air-flow mechanism 62 internally or externally of the unit housing 20 proximate an air-intake opening 60 creates a positive pressurization and an air flow through the heat-transfer chamber 32. While placement of an air-flow mechanism internally or externally of the unit housing 20 proximate an air-outlet opening 70, 72 creates a negative pressurization and an air flow through the heat-transfer chamber 32.

An air-flow mechanism 62, such as a fan, urges air into the unit housing and, at the same time, urges air outwardly of the unit housing through the air-outlet openings. If air-flow mechanisms 62 are placed proximate the air-outlet openings, air is urged out of the outlets 70, 72 while a negative air pressure is essentially created in the heat-transfer chamber 32 of the unit housing 20 drawing in air through the air-intakes 60. However, as shown in the exemplary embodiment, the air-flow mechanism 62 may be placed in the proximity of the air-intake opening 60 drawing air into and pressurizing the heat-transfer chamber 32 of the unit housing 20. Because the heat-transfer chamber 32 is pressurized, cooled air is urged out of the outlets 70, 72.

The invention uses heat transfer between a cooler substance and warmer air to cool the warmer air. Air is chilled through heat-transfer that takes place between the entering air and the phase-changeable, frozen substance disposed in the heat-transfer chamber 32. The air entering the heat-transfer chamber 32 is typically at a higher temperature than the frozen substance. The invention is particularly adapted for use of phase-changeable, frozen substance such as ice. Melting ice takes on heat while extracting heat from air adjacent the cells 40. The invention is suitable for use of both traditional ice made of frozen water as well as so-called dry ice that is frozen carbon dioxide.

By definition, water ice is frozen solid at 32 degrees Fahrenheit (which is 0 degrees Centigrade). This is the freezing point of water to ice, and conversely, the melting point of ice to water. The temperature differential in the heat-transfer chamber 32 causes the ice to melt. The heat of fusion (also known as "latent heat of fusion" and "enthalpy of fusion") required to convert solid water (ice) into liquid water causes heat to be extracted from the air thereby cooling the air. Other solid-to-liquid transformations use heat of fusion to bring about cooling.

The invention is adapted for use of water ice in several forms. For example, liquid water may be placed in the cells and then placed in a typical refrigeration unit to freeze the water to ice. This type of loading is particularly useful and possible when the removable subassembly 50 is used. The invention also contemplates loading crushed ice 3 (as shown in FIG. 1) into the cells 40 and tray housing 52 either with the tray subassembly 50 in place in the unit housing 20 or prior to placement of the tray-cell subassembly 50 into the unit housing 20.

Although some heat transfer and accompanying chilling can occur with a chilled liquid such as water that is not frozen, greater heat-transfer and cooling takes place between the frozen state of a substance such as ice in this case and air that is at a higher temperature than the melting point.

Dry-ice utilizes vaporization rather than fusion or melting to transfer heat, and thereby effect cooling. Heat is transferred from air entering the heat-transfer chamber 32 to convert dry-ice to gaseous carbon dioxide because of heat of sublimation. Sublimation is generally defined as the transition of a substance from a solid state directly to a gaseous state. The phrase "phase-changeable, frozen substance" is used herein to emphasize that the invention also teaches use of a vaporizable, frozen substance, such as dry-ice.

The invention also contemplates the use of other meltable frozen media suitable for heat transfer such as gels that are freezable and capable of engaging in heat transfer. Such gels are those of the type used in pouches to treat sport injuries.

The invention may be practiced with many different sizes of motorized fans. A suitable air-flow mechanism for a housing of the size of a typical ice chest or cooler is a fan operable on 12 volts direct current (DC) voltage drawing from about 0.35 ampere to about 0.50 ampere of current.

The apparatus may be suitably powered by any electrical power source. However, because the apparatus is designed to be useful at a location remote from an AC power source, the exemplary embodiment is adapted to receive DC voltage. Suitable DC voltage is a 12-volt source such as from a car battery, which source can be accessed through a cigarette lighter socket or a DC accessory outlet typically found in motor vehicles. The invention may also be practiced with voltage sources of less than 12 volts DC. The invention also contemplates powering by an external battery-pack that may be connected through the electrical receptacle 90 or powering through an internal battery-pack.

In this description, references to "front" and "rear" are not intended to be limited, but are intended to serve as a point of reference to aid in understanding the invention.

The above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A portable air conditioner comprising:
   a substantially upright housing enclosing
      a heat-transfer chamber,
      a loading chamber;
      a substantially horizontally-disposed removable tray separating said heat-transfer chamber from said loading chamber, having depending from a perimeter thereof at least one substantially vertically-oriented heat-transfer cell comprising an elongated cell housing for retaining a phase-changeable substance, said elongated cell housing extending substantially within said heat-transfer chamber having an upper open end accessible from an upper region and terminating in a lower closed end, and having at least one venting aperture that places said heat-transfer chamber and said loading chamber in air-flow communication with one another wherein said heat-transfer chamber and said loading chamber are separated from one another except for said at least one venting aperture;
   at least one air-intake opening for receiving an air flow into said heat-transfer chamber;
   at least one air-outlet opening for venting air from said heat-transfer chamber; and
   an air-flow mechanism disposed proximate one of said air-intake opening and said air-outflow opening for urging air into said heat-transfer chamber into contact with said at least one heat-transfer cell and then through said at least one air-outlet opening outwardly of said heat transfer chamber.

2. The portable air conditioner of claim 1, wherein said at least one venting aperture is disposed in said perimeter of said substantially horizontally-disposed removable tray.

3. The portable air conditioner of claim 2, wherein said perimeter of said substantially horizontally-disposed removable tray comprises a flange at an uppermost region thereof.

4. The portable air conditioner of claim 1, wherein said cell housing comprises a thermally conductive material.

5. The portable air conditioner of claim 4, wherein said thermally conductive material comprises a material having a predominant quantity of an element selected from a class consisting of aluminum, copper, gold, silver, and tin.

6. The portable air conditioner of claim 1, further comprising a quantity of a frozen phase of said phase-changeable substance disposed within said at least one heat-transfer cell extending upwardly from said lower closed end thereof.

7. The portable air conditioner of claim 6, wherein said quantity of a frozen phase of said phase-changeable substance comprises water ice.

8. The portable air conditioner of claim 6, wherein said quantity of a frozen phase of said phase-changeable substance comprises frozen carbon dioxide.

9. The portable air conditioner of claim 6, wherein said quantity of a frozen phase of said phase-changeable substance comprises a gel.

10. The portable air conditioner of claim 6, wherein said quantity of a frozen phase of said phase-changeable substance extends through said opening of said at least one substantially vertically-oriented heat-transfer cell upwardly substantially throughout an uppermost region of said tray.

11. A method for cooling an environment comprising:
providing a substantially upright housing enclosing
- a heat-transfer chamber,
- a loading chamber,
- a substantially horizontally-disposed removable tray separating said heat-transfer chamber from said loading chamber, having depending from a perimeter thereof at least one substantially vertically-oriented heat-transfer cell comprising an elongated cell housing for retaining a phase-changeable substance, said elongated cell housing extending substantially within said heat-transfer chamber having an upper open end accessible from an upper region and terminating in a lower closed end, and having at least one venting aperture that places said heat-transfer chamber and said loading chamber in air-flow communication with one another thereby promoting melting of said quantity of a frozen phase of said phase-changeable substance in an upper region of said at least one heat-transfer cell so as to facilitate uniform melting along a length thereof,
- at least one air-intake opening for receiving an air flow into said heat-transfer chamber,
- at least one air-outlet opening for venting air from said heat-transfer chamber, and
- an air-flow mechanism disposed proximate one of said air-intake opening and said air-outflow opening for urging air into said heat-transfer chamber into contact with said at least one heat-transfer cell and then through said at least one air-outlet opening outwardly of said heat transfer chamber;

loading said at least one substantially vertically-oriented heat-transfer cell with a quantity of a frozen phase of said phase-changeable substance such that said quantity of a frozen phase of said phase-changeable substance extends upwardly from said lower closed end of said substantially vertically-oriented heat-transfer cell;
activating said air-flow mechanism.

12. The method of claim 11, wherein said quantity of a frozen phase of said phase-changeable substance extends through said opening of said at least one substantially vertically-oriented heat-transfer cell upwardly substantially throughout an uppermost region of said tray.

13. The method of claim 11, wherein said quantity of a frozen phase of said phase-changeable substance comprises a quantity of water ice.

14. The method of claim 11, wherein said quantity of a frozen phase of said phase-changeable substance comprises a quantity of frozen carbon dioxide.

15. The method of claim 11, wherein said quantity of a frozen phase of said phase-changeable substance comprises a quantity of frozen gel.

16. A method for cooling an environment comprising:
providing a substantially upright housing enclosing
- a heat-transfer chamber,
- a loading chamber,
- a substantially horizontally-disposed removable tray separating said heat-transfer chamber from said loading chamber, having depending from a perimeter thereof at least one substantially vertically-oriented heat-transfer cell comprising an elongated cell housing for retaining a phase-changeable substance, said elongated cell housing extending substantially within said heat-transfer chamber having an upper open end accessible from an upper region and terminating in a lower closed end, and having at least one venting aperture that places said heat-transfer chamber and said loading chamber in air-flow communication with one another wherein said heat-transfer chamber and said loading chamber are separated from one another except for said at least one venting aperture so as to promote melting of said phase-changeable substance in a frozen phase in an upper region of said at least one heat-transfer cell so as to facilitate uniform melting along a length thereof,
- at least one air-intake opening for receiving an air flow into said heat-transfer chamber,
- at least one air-outlet opening for venting air from said heat-transfer chamber, and
- an air-flow mechanism disposed proximate one of said air-intake opening and said air-outflow opening for urging air into said heat-transfer chamber into contact with said at least one heat-transfer cell and then through said at least one air-outlet opening outwardly of said heat transfer chamber;

removing said substantially horizontally-disposed removable tray from said substantially upright housing, filling said at least one substantially vertically-oriented heat-transfer cell with a quantity of a substantially fluid phase of said phase-changeable substance;
causing said phase-changeable substance to freeze in place within said substantially horizontally-disposed removable tray;
placing said substantially horizontally-disposed removable tray containing said quantity of said phase-changeable substance in a frozen phase within said housing so as to separate said heat-transfer chamber from said loading chamber; and activating said air-flow mechanism.

17. The method of claim 16, wherein said quantity of a substantially fluid phase of said phase-changeable substance comprises a quantity of water.

18. The method of claim 16, wherein said quantity of a substantially fluid phase of said phase-changeable substance comprises a quantity of a gel.

\* \* \* \* \*